(12) United States Patent
Lochocki, Jr.

(10) Patent No.: US 7,387,190 B2
(45) Date of Patent: Jun. 17, 2008

(54) OIL PAN ASSEMBLY AND METHOD OF SELECTING AN OIL PAN

(75) Inventor: Ronald F. Lochocki, Jr., Ypsilanti, MI (US)

(73) Assignee: General Motors Corporation, Detroit, MI (US)

( * ) Notice: Subject to any disclaimer, the term of this patent is extended or adjusted under 35 U.S.C. 154(b) by 817 days.

(21) Appl. No.: 10/738,766

(22) Filed: Dec. 17, 2003

(65) Prior Publication Data

US 2005/0133306 A1 Jun. 23, 2005

(51) Int. Cl.
*F16N 31/00* (2006.01)
(52) U.S. Cl. .................................. 184/106; 184/1.5
(58) Field of Classification Search .............. 74/606 R, 74/606 A; 184/1.5, 106
See application file for complete search history.

(56) References Cited

U.S. PATENT DOCUMENTS

| | | | |
|---|---|---|---|
| 2,480,486 A | 8/1949 | Leazer | |
| 3,384,063 A | 5/1968 | Moulton et al. | |
| 4,417,552 A * | 11/1983 | Walter et al. | 123/198 E |
| 5,090,528 A * | 2/1992 | Massel | 192/3.34 |
| 5,130,014 A * | 7/1992 | Volz | 210/130 |
| 5,193,415 A * | 3/1993 | Massel | 74/606 R |
| 5,662,007 A | 9/1997 | Starker et al. | |
| 5,692,909 A | 12/1997 | Gadzinski | 439/34 |
| 5,863,424 A | 1/1999 | Lee | 210/168 |
| 6,013,179 A | 1/2000 | Laughlin et al. | 210/172 |
| 6,058,898 A | 5/2000 | Freese | 123/195 C |
| 6,183,632 B1 | 2/2001 | Covington | 213/168 |
| 6,273,049 B1 | 8/2001 | Okuda et al. | 123/195 C |
| 6,314,808 B1 | 11/2001 | Williams et al. | 73/290 B |
| 6,343,796 B1 | 2/2002 | Lee et al. | 277/605 |
| 6,374,794 B1 * | 4/2002 | Dudemaine | 123/195 H |
| 6,406,398 B1 * | 6/2002 | Hughes et al. | 475/116 |
| 6,488,844 B2 | 12/2002 | Willis et al. | 210/172 |
| 6,523,561 B2 | 2/2003 | Kapcoe et al. | 137/15.01 |
| 6,539,912 B1 | 4/2003 | Beer | 123/196 R |
| 7,055,405 B1 * | 6/2006 | Nitsche | 74/606 A |
| 2002/0144863 A1 | 10/2002 | Powell | 184/1.5 |
| 2003/0024768 A1 | 2/2003 | Jones | 184/1.5 |
| 2003/0029412 A1 | 2/2003 | Kato et al. | 123/195 C |
| 2004/0248693 A1 * | 12/2004 | Komer et al. | 475/269 |
| 2005/0054473 A1 * | 3/2005 | Burns et al. | 475/257 |
| 2005/0178238 A1 * | 8/2005 | Komer et al. | 74/606 R |
| 2006/0131141 A1 * | 6/2006 | Hinson et al. | 200/6 R |

FOREIGN PATENT DOCUMENTS

| | | |
|---|---|---|
| DE | 1958024 | 11/1970 |
| DE | 3046602 | 7/1982 |
| DE | 3817981 | 12/1988 |
| DE | 3929592 | 5/1992 |
| DE | 19955437 | 5/2001 |
| FR | 2762360 | 10/1997 |
| JP | 61038259 | 2/1986 |

* cited by examiner

*Primary Examiner*—Chong H. Kim

(57) ABSTRACT

A transmission oil pan assembly includes an oil pan matable with a transmission case to at least partially define a transmission interior space, and an accessing component for accessing an interior component located inside of the transmission interior space from outside of the transmission interior space. The oil pan is formed with structure adapted to support the accessing component. The oil pan may be formed with an opening adapted to receive the accessing component. A method of selecting an oil pan from an inventory of oil pans with differently disposed accessing components is also provided.

18 Claims, 5 Drawing Sheets

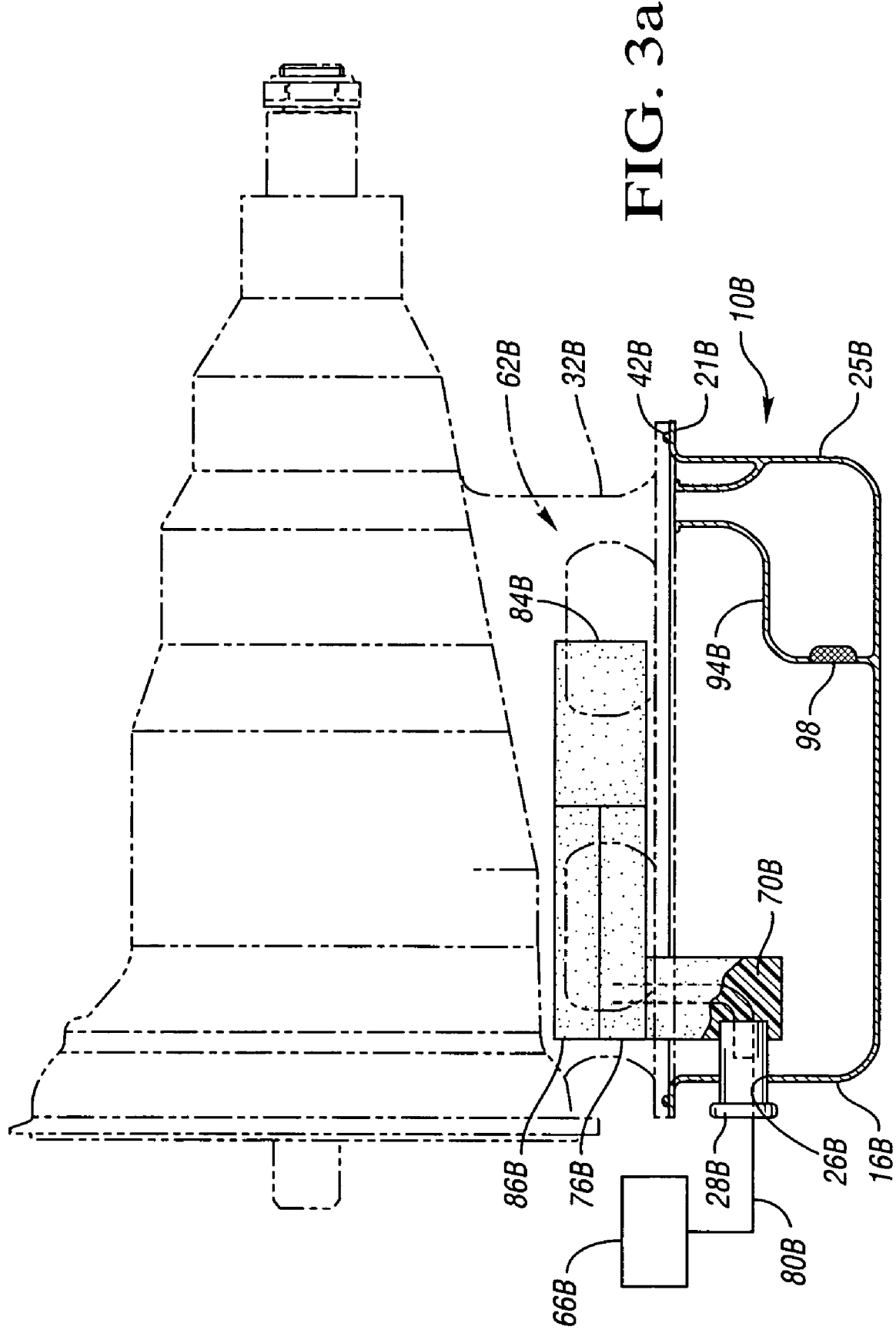

OIL PAN ASSEMBLY AND METHOD OF SELECTING AN OIL PAN

TECHNICAL FIELD

This invention relates to automotive transmission oil pans, transmission electrical connectors and transmission oil level measuring devices.

BACKGROUND OF THE INVENTION

Automotive transmissions typically have a die-cast transmission case covering and at least partially containing the gearbox and the necessary solenoids, valves, and other components that form the transmission. The gearbox is continuously bathed in transmission oil for cooling of the moving gears. Accordingly, the transmission case partially forms a closed interior space for containing the oil. An oil pan is usually mounted to the transmission case for collecting the transmission oil and forms the remainder of the closed interior space. An oil pan is typically bounded by a flange matable with the transmission case. Walls extend downward from the flange and are joined by a floor. Thus, the volume of the oil pan is usually directly correlated with the perimeter of the flange.

The transmission case is typically cast with an opening to which an electrical connector is mounted. The electrical connector connects external wiring from electrical components located outside of the transmission case to other electrical components located inside of the case. For example, wiring from the engine control unit, engine sensors or other types of sensors or from a transmission control module, all of which are typically located outside of the transmission case, may be routed to electrical components, such as solenoids, located inside of the transmission case. The transmission case may also be cast with an opening for receiving an oil fill tube. Transmission oil may be added to the transmission via the oil fill tube. A dipstick is commonly movable within the oil fill tube for measuring the oil fill level in the transmission. Because the transmission case is a die-cast part, retooling of the case may be an expensive undertaking. Accordingly, the same transmission case design having a given electrical connector opening location and a given fill tube opening location is often used on differently configured vehicles. Access to the electrical connector and to the fill tube opening may be affected by the relative positioning of the driveshafts, exhaust system, steering column, and other vehicle components.

SUMMARY OF THE INVENTION

A transmission oil pan assembly includes an oil pan matable with a transmission case to at least partially define a transmission interior space, and an accessing component for accessing an interior component located inside of the transmission interior space from outside of the transmission interior space, wherein the oil pan is formed with structure adapted to support the accessing component. The oil pan may be formed with an opening adapted to support the accessing component.

The accessing component may be an electrical connector adaptable for transmitting non-mechanical control signals between an electrical component located outside of the transmission interior space and the interior component, the interior component being another electrical component located inside of the transmission interior space.

Alternatively, the accessing component may be an oil level assembly including an oil level measuring device and fill tube receiving structure. The oil pan structure adapted to support the accessing component is adapted to support the fill tube receiving structure. The fill tube receiving structure is connectable to an oil fill tube located on the vehicle for adding oil to the transmission. The measuring device is translatable within the fill tube receiving structure for measuring oil level within the transmission interior space.

Preferably, the transmission case is characterized by the absence of openings adapted to receive an electrical connector (i.e., the electrical connector may be mated to the oil pan, but not to the transmission case) and by an absence of openings adapted to receive an oil level assembly. The oil pan is preferably stamped metal, injection-molded plastic or machine-molded aluminum. Because the transmission case is typically die-cast, it is difficult to retool the case to relocate the structure adapted to support the accessing component (i.e., to relocate the opening for the electrical connector or the opening for the oil level assembly). The oil pan, however, is much easier to reconfigure. Mounting the accessing component to the oil pan will afford flexibility in positioning the accessing component at different locations on the pan to maximize accessibility of the accessing component for installation and maintenance.

The oil pan assembly may further include an oil filter disposable within the interior space and connectable to the oil pan, a gasket formed in either the transmission case or the oil pan and disposable between the transmission case and the oil pan, and a frame having integral wires disposable within the transmission interior space between the electrical connector and at least one other electrical component located within the transmission interior space for transmitting electrical signals between the connector and the other component.

The oil pan may have a plurality of sidewalls, a floor extending between the sidewalls, and an extension opposing the floor and configured to fit between at least one of the walls and the case. The extension is a secondary housing member configured to increase the volume of the oil pan. The extension may include a domed portion opposing the floor. In one aspect of the invention, the accessing component is mountable in one of the sidewalls. In another aspect of the invention, the accessing component is mountable in the floor. In yet another aspect of the invention, the accessing component is mountable in the extension.

A method of selecting a transmission oil pan for use on a vehicle having a transmission case comprises maintaining an inventory of oil pans matable with the transmission case to at least partially define a transmission interior space, the inventory including a first oil pan and a second oil pan. Each of the oil pans includes a front sidewall, a rear sidewall, a left sidewall and a right sidewall and a floor extending between the sidewalls. Each oil pan may also include an optional extension. An accessing component for accessing an interior component located inside of the transmission interior space from outside of the transmission interior space is mounted to each of the oil pans. A first accessing component is mounted at a first location on the first oil pan and a second accessing component is mounted at a second location on the second oil pan. The second location is different than the first location. The first location and the second location are each selected from the group consisting of the floor, the front sidewall, the rear sidewall, the left sidewall, the right sidewall and, if included on the oil pan, the optional extension. The method also includes selecting one of the first oil pan and the second oil pan based upon the first location and the second location.

The above features and advantages, and other features and advantages of the present invention are readily apparent from the following detailed description of the best modes for carrying out the invention when taken in connection with the accompanying drawings.

BRIEF DESCRIPTION OF THE DRAWINGS

FIG. 3a is a schematic side view illustration of an oil pan assembly showing in vertical cross-section an oil pan having an integral oil filter, showing in phantom a transmission case mated with the oil pan, and showing in elevation an accessing component mounted to the oil pan;

DESCRIPTION OF THE PREFERRED EMBODIMENTS

Figure 1:
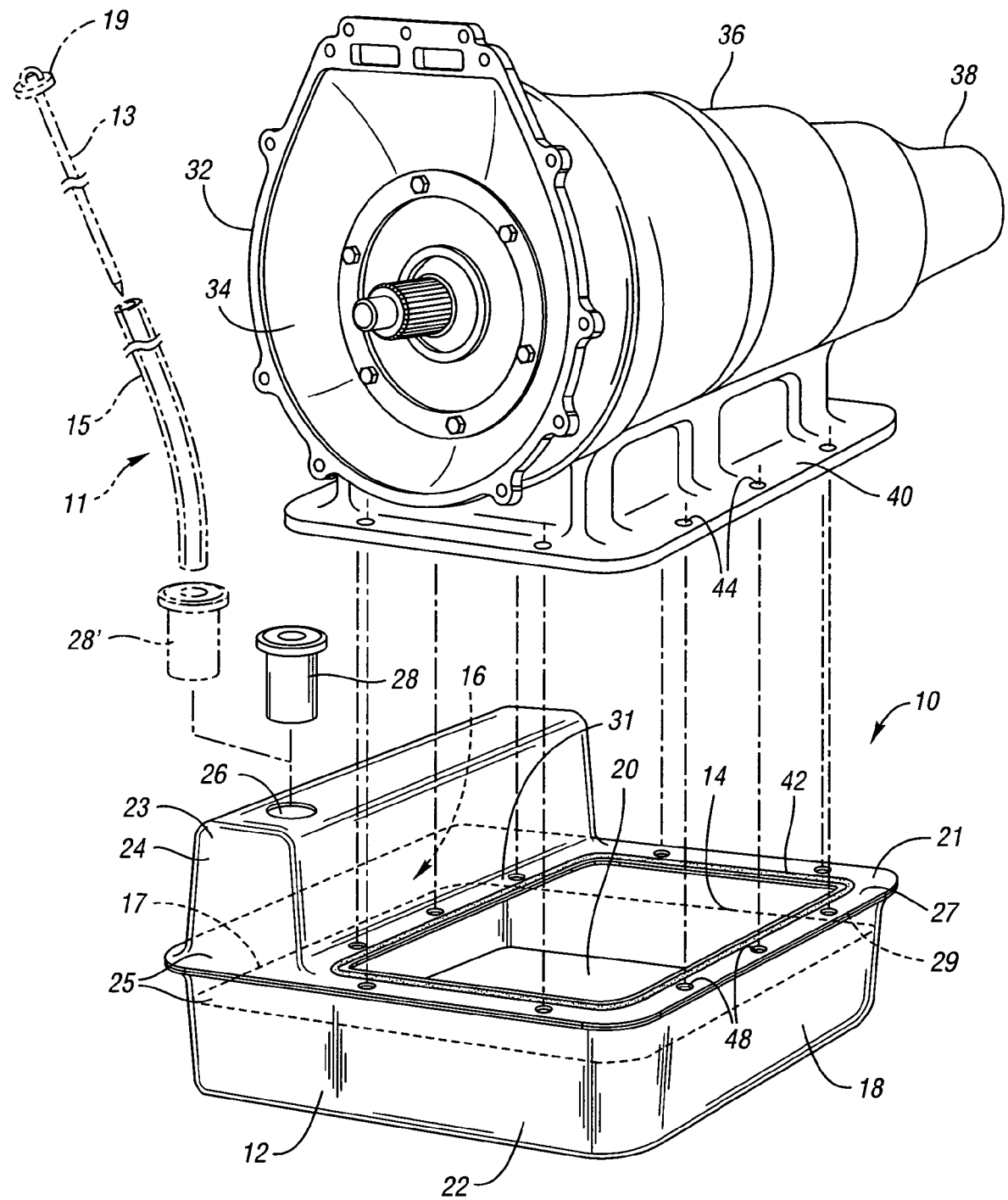
FIG. 1 is a schematic perspective illustration of an oil pan assembly matable with a transmission case.

FIG. 1 shows an oil pan assembly 10. The oil pan assembly 10 includes a front sidewall 12, a rear sidewall 14, a left sidewall 16, a right sidewall 18 and a floor 20 forming a bottom portion 22. The oil pan assembly 10 is further formed with an extension 24 which may also be referred to as a secondary housing member. The bottom portion 22 and the extension 24 are depicted as separate components in FIG. 1. They may also be formed as a one-piece unit. The extension 24 is formed with structure adapted to support an accessing component. The structure adapted to support an accessing component is preferably accessing component opening 26, which is adapted to receive the accessing component. The accessing component may be an electrical connector 28. Thus, the electrical connector 28 may be supported by the extension 24 at the accessing component opening 26. An O-ring or other sealing device (not shown) may be disposed between the extension 24 and the electrical connector 28 to maintain a leak free seal between the electrical connector 28 and the accessing component opening 26. Alternatively, the electrical connector 28 may be molded into (i.e., integrally formed with) the extension 24 as a unit.

Alternatively, the accessing component may be an oil level assembly 11 that includes fill tube receiving structure 28' and an oil level measuring device 13 (both shown in phantom). The accessing component opening 26 may be adapted to receive fill tube receiving structure 28' such that the fill tube receiving structure 28' is supported at the extension 24. A hollowed oil fill tube 15 (shown in phantom) may be connected to the fill tube receiving structure 28' which is similarly hollowed. The oil level measuring device 13, may be in the form of a dipstick, and is translatably insertable and withdrawable through the hollowed connected oil fill tube 15 and fill tube receiving structure 28' into oil (represented in phantom by oil level 17) in the bottom portion 22 to measure the oil level 17. Preferably, the oil level measuring device 13 includes a grab handle 19 matable with the tube 15. The tube 15 is of sufficient length such that the grab handle 19 is disposed in and may be accessed from an engine compartment (not shown) on a vehicle (not shown) to which the transmission case 32, the extension 24 and the bottom portion 22 are mounted. Those skilled in the art will recognize that the fill tube receiving structure 28' may be molded into (i.e. integrally formed with) the extension 24 as a unit.

The bottom portion 22 and the extension 24 form an oil pan 25. The oil pan 25 may be stamped metal, injected molded of a plastic material, or machined aluminum. Those skilled in the art will realize a variety of methods of forming an oil pan. Preferably, the extension 24 is injection molded of a plastic material. The extension 24 includes a domed portion 23 as well as an extension flange 27. Alternatively, the extension 24 may not have a domed portion (i.e., it may be substantially flat), in which case the electrical connector opening 26 would be disposed downward from the position shown in FIG. 1, on substantially the same level as the extension flange 27. Other alternatively-shaped extensions may also be employed. The extension 24 is mated with the bottom portion 22. The bottom portion 22 includes a bottom portion flange 29. The front sidewall 12, the rear sidewall 14 and the right sidewall 18 partially form the bottom portion flange 29. The extension flange 27 and the bottom portion flange 29 cooperatively form an oil pan flange 21.

A transmission case 32 includes a torque converter portion 34, a main case 36 and a case extension portion 38. The transmission case 32 is formed with a pan rail 40. Preferably, the transmission case 32 is characterized by an absence of openings adapted to receive the electrical connector 28 or the fill tube receiving structure 28'. Thus, the transmission case 32 does not dictate the location of the electrical connector 28.

The transmission case 32 is matable with the oil pan 25. Specifically, the pan rail 40 is adapted to mate with the flange 21. One of the bottom portion 22 or the extension 24 may be formed with an integral gasket disposed between the extension 24 and the bottom portion 22 for sealing therebetween. Alternatively, the extension 24 and the bottom portion 22 may be adhesively or otherwise fastened to one another in a leak-free manner. As depicted in FIG. 1, a gasket 42 is formed in the flange 21 for sealing the pan rail 40 and the flange 21 together. Alternatively, a gasket may be disposed in the pan rail 40. The pan rail is formed with pan rail openings 44 adapted to mate with oil pan flange openings 48 in the oil pan flange 21. Fasteners (not shown) disposed through the pan rail openings 44 and the oil pan flange openings 48 will enable the mating of the transmission case 32 and the oil pan assembly 10.

Notably, the extension 24 permits a larger bottom portion 22 to be mated to the transmission case 32, thus increasing oil pan volume. (Without the extension 24, the left sidewall 16 of the bottom portion 22 would be disposed directly beneath the left side 31 of oil pan flange 21, resulting in decreased pan volume.) Increased pan volume allows for increased oil volume, decreasing oil deterioration and increasing lubrication sufficiency. Additionally, increasing the pan volume by use of a wider pan, as in FIG. 1, keeps the oil level below the moving components of the transmission, thus decreasing the propensity of oil foaming and rotational resistance.

Figure 2:
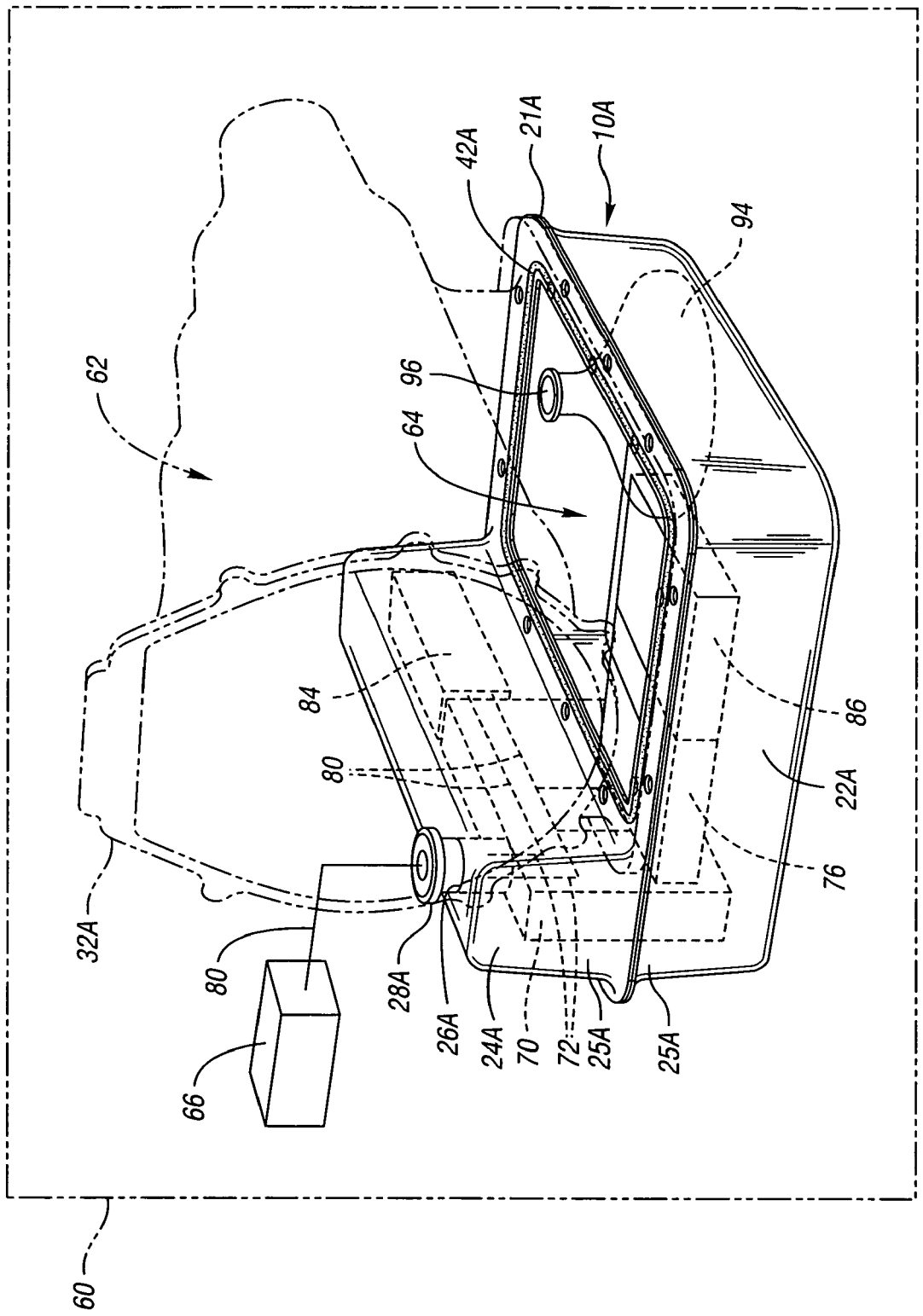
FIG. 2 is a schematic perspective illustration of another oil pan assembly mated with a transmission case on a vehicle and including additional components disposed in an interior space formed by the mated case and oil pan.

FIG. 2, wherein like reference numbers refer to like components in FIG. 1, depicts a vehicle 60 shown in phantom. The vehicle 60 includes a transmission case 32A mated with an oil pan 25A of an oil pan assembly 10A. The oil pan 25A includes a bottom portion 22A and an optional extension 24A. The mated transmission case 32A and oil pan 25A form a transmission interior space 62. The transmission interior space 62 includes an oil pan interior space 64. The extension 24A is formed with an accessing component opening 26A adapted to receive an electrical connector 28A. Accordingly, the electrical connector 28A is mounted in the extension 24A.

Non-mechanical control signals may be transmitted between an outside electrical component 66 and the electrical connector 28A. "Non-mechanical control signals" include electrical and fiber optic control signals. The outside electrical component 66 may be one of a variety of components located on the vehicle such as a throttle position sensor, an engine coolant temperature sensor, an engine speed sensor, a brake position sensor, an air conditioning sensor, a cruise control sensor, a four wheel-drive/two wheel-drive sensor, or a manifold pressure sensor. The outside electrical component 66 may also be an engine control unit.

A lead frame 70 is shown disposed in the transmission interior space 62. The lead frame 70 is formed with integral wires 72. The lead frame 70 may be formed by injection molding a plastic material around the wires 72. Use of such a lead frame 70 may avoid the use of an internal wiring harness to connect to components located within the transmission interior space 62, thereby simplifying assembly and possibly reducing assembly time.

An interior component, also referred to as an inside electrical component 76, is disposed within the transmission interior space 62. The inside electrical component 76 may be a solenoid assembly designed to transform non-mechanical control signals into mechanical motion. The outside electrical component 66 as well as the inside electrical component 76 may each be responsive to non-mechanical control signals. The outside electrical component 66 is able to send non-mechanical control signals 80 through the electrical connector 28A and the integral wire 72 disposed within the lead frame 70 to the inside electrical component 76. If the inside electrical component 76 is a solenoid assembly, it may be operatively connected to a valve body assembly 86. Thus, non-mechanical control signals 80 may be transformed in the solenoid assembly into mechanical forces which act upon the valve body assembly 86 for hydraulically controlling the transmission on the vehicle 60.

A transmission control unit 84, also referred to as a transmission control module, is shown disposed within the transmission interior space 62. The transmission control unit 84 is operatively connected to the electrical connector 28A through the lead frame 70. The transmission control unit 84 is able to generate and transmit non-mechanical control signals 80 through the lead frame 70 to the inside electrical component 76 via the integral wires 72 of the lead frame 70. The transmission control unit 84 may also receive non-mechanical control signals 80 from the outside electrical component 66 through the electrical connector 28A. The outside electrical component 66, the inside electrical component 76 and the transmission control unit 84 may form at least a part of a local area network of components, including control units, located both inside of and outside of the transmission interior space and able to communicate at least partly through the electrical connector 28A.

Preferably, the electrical connector 28A, the lead frame 70, the inside electrical component 76 and the transmission control unit 84 are located above the oil level (not shown) in the oil pan 25A. Use of the extension 24A helps provide additional pan interior space 64 in order to help achieve this objective.

The oil pan assembly 10A further includes a gasket 42A formed in a flange 21A of the oil pan assembly 10A and disposed between the transmission case 32A and the flange 21A.

The oil pan assembly 10A further includes an oil filter 94 shown connected to the oil pan 25A. The oil filter 94 may be welded or otherwise fastened to the oil pan 25A. The oil filter 94 is shown with a pump inlet opening 96. The pump inlet opening 96 is adapted to receive a pump located within the transmission interior space 62.

Referring to FIG. 3a, wherein like reference numbers refer to like components in FIGS. 1-2, an oil pan assembly 10B is shown formed with an integral oil filter 94B. The integral oil filter 94B is shown with a filter inlet 98. The oil pan assembly 10B includes an oil pan 25B mated with a transmission case 32B (shown in phantom and depicted, for purposes of illustration, with a simplified shape) forming a transmission interior space 62B. An extension (not shown) similar to extension 24 of FIG. 1 may or may not be included within the oil pan assembly 10B. A gasket 42B is formed in a flange 21B of the oil pan 25B for sealing between the oil pan 25B and the case 32B. The oil pan 25B is formed with an accessing component opening 26B in a left sidewall 16B. The accessing component opening 26B is adapted to receive an electrical connector 28B. Accordingly, the electrical connector 28B is mounted in the left sidewall 16B of the oil pan 25B.

A lead frame 70B is disposed within the transmission interior space 62B. The lead frame 70B is operatively connected to the electrical connector 28B via non-mechanical control signals 80B. An outside electrical component 66B is able to communicate with the electrical connector 28B. An inside electrical component 76B is disposed within the transmission interior space 62B. The inside electrical component 76B is operatively connected to the lead frame 70B. Accordingly, non-mechanical control signals 80B may be sent between the outside electrical component 66B and the inside electrical component 76B via the electrical connector 28B and the lead frame 70B. Inside electrical component 76B may be a solenoid assembly. A valve body assembly 86B is shown operatively connected to the inside electrical component 76B. A transmission control unit 84B is also shown disposed within the interior space 62B. The transmission control unit 84B may be operatively connected to the electrical connector 28B through the lead frame 70B. Accordingly, non-mechanical control signals 80B between the outside electrical component 66B and the transmission control unit 84B may be used to actuate and control the inside electrical component 76B.

Figure 3B:
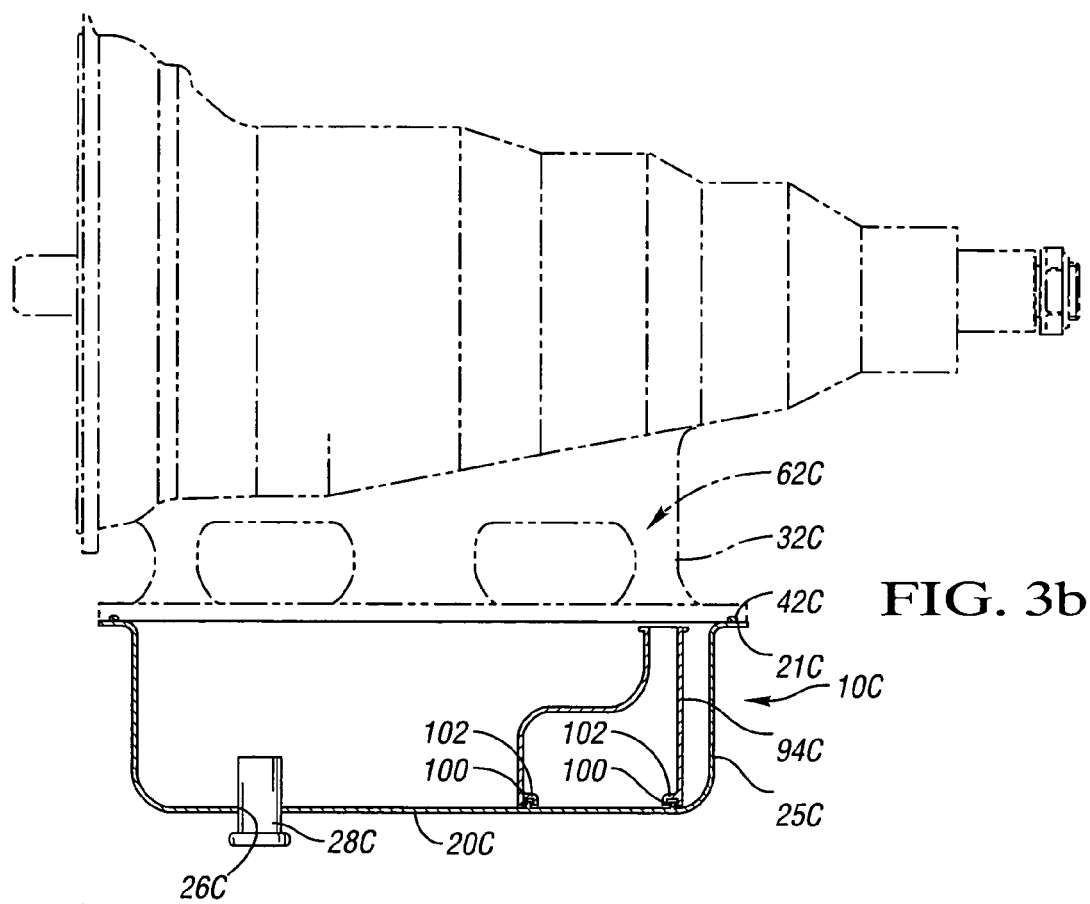
FIG. 3b is a schematic side view illustration of an oil pan assembly showing in vertical cross-section an oil pan having an integral, snap-in oil filter, showing in phantom a transmission case mated with the oil pan, and showing in elevation an accessing component mounted to the oil pan.

Referring to FIG. 3b, wherein like reference numbers refer to like components in FIGS. 1-3a, an oil pan assembly 10C including an oil pan 25C mated with a transmission case 32C (shown in phantom) is shown. An extension (not shown) similar to extension 24 of FIG. 1 may or may not be included in the oil pan assembly 10C. The mated oil pan 25C and transmission case 32C define a transmission interior space 62C. The oil pan 25C is formed with filter mounting structure 100 which may be ridges on a floor 20C of the oil pan 25C. The filter mounting structure 100 is matable with filter receiving structure 102, which may be flanges formed in an oil filter 94C. Other means of mating the oil filter 94C with the oil pan 25C include welding, adhesion, and a variety of fastening techniques that will be readily recognized by those skilled in the art. Accordingly, the oil filter 94C may be made integral with the oil pan 25C. An accessing component opening 26C is formed in the floor 20C. The accessing component opening 26C is adapted to receive an electrical connector 28C. The electrical connector 28C may connect outside electrical components with inside electrical components or a transmission control unit as in FIGS. 2-3a. A gasket 42C is formed in a flange 21C of the oil pan 25C and is disposed between the transmission interior case 32C and the oil pan 25C to form a seal therebetween.

Figure 3C:
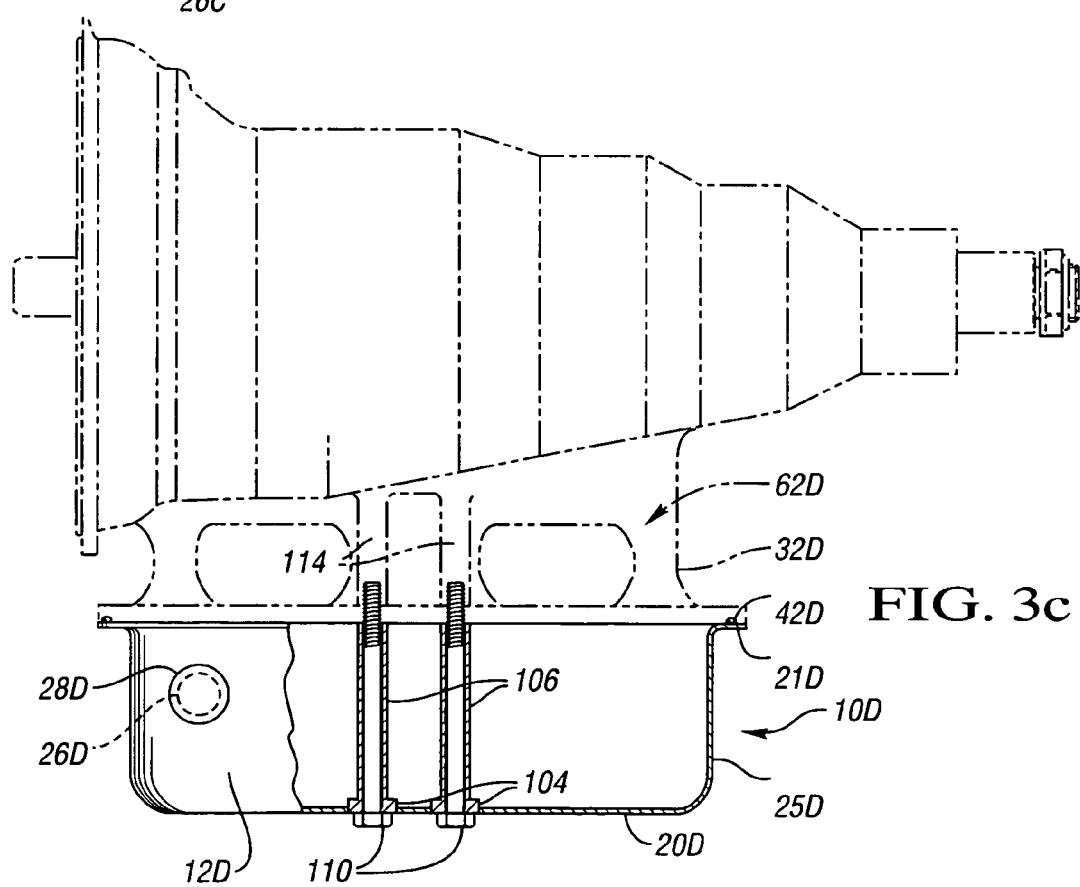
FIG. 3c is a schematic side view illustration of an oil pan assembly showing an oil pan in partial vertical cut-away to expose fasteners disposed through a floor thereof, showing in phantom a transmission case mated with the oil pan, and showing in elevation an accessing component mounted to a sidewall of the oil pan.

Referring to FIG. 3c, wherein like reference numbers refer to like components in FIGS. 1-3b, an oil pan assembly 10D is depicted. The oil pan assembly 10D includes an oil pan 25D. An extension (not shown) similar to extension 24 of FIG. 1 may or may not be included in the oil pan assembly 10D. A fragmentary view of a front sidewall 12D of the oil pan 25D shows that the front sidewall 12D is formed with an accessing component opening 26D. The accessing component opening 26D is adapted to receive an electrical connector 28D. As depicted in FIGS. 2-3a, the electrical connector 28D may communicate non-mechanical control signals between an outside electrical component and an inside electrical component disposed within a transmission interior space 62D formed by the mated transmission case 32D and oil pan 25D. A gasket 42D is formed in a flange 21D of the oil pan 25D for sealing engagement of the transmission case 32D and the oil pan 25D.

Accordingly, as shown in FIGS. 1-3c, the invention allows the accessing component (e.g., an electrical connector or an oil level assembly) to be disposed in a plurality of locations in an oil pan assembly. Flexible location of the accessing component allows for the most advantageous location for access during assembly or servicing given the relative position of other components on a vehicle. Preferably, the accessing component is located at a molded section of the pan, as molded elements are relatively easy to retool.

Referring again to FIG. 3c, the oil pan 25D is formed with fastener housing openings 104 in a floor 20D of the oil pan 25D. The fastener housing openings 104 are adapted to receive fastener housings 106. Alternatively, the fastener housings 106 may be integrally formed in the floor 20D. The fastener housings 106 may house fasteners 110 such as bolts. The fasteners 110 extend through the fastener housings 106 to mated portions 114 of the transmission case 32D. Accordingly, the transmission case 32D is fastened to the oil pan assembly 10D via fasteners 110 disposed through the floor 20D of the oil pan 25D. Disposition of fasteners 110 through the floor 20D may reduce the total number of fasteners necessary to retain the mating of the pan 25D and the case 32D.

Figure 4:
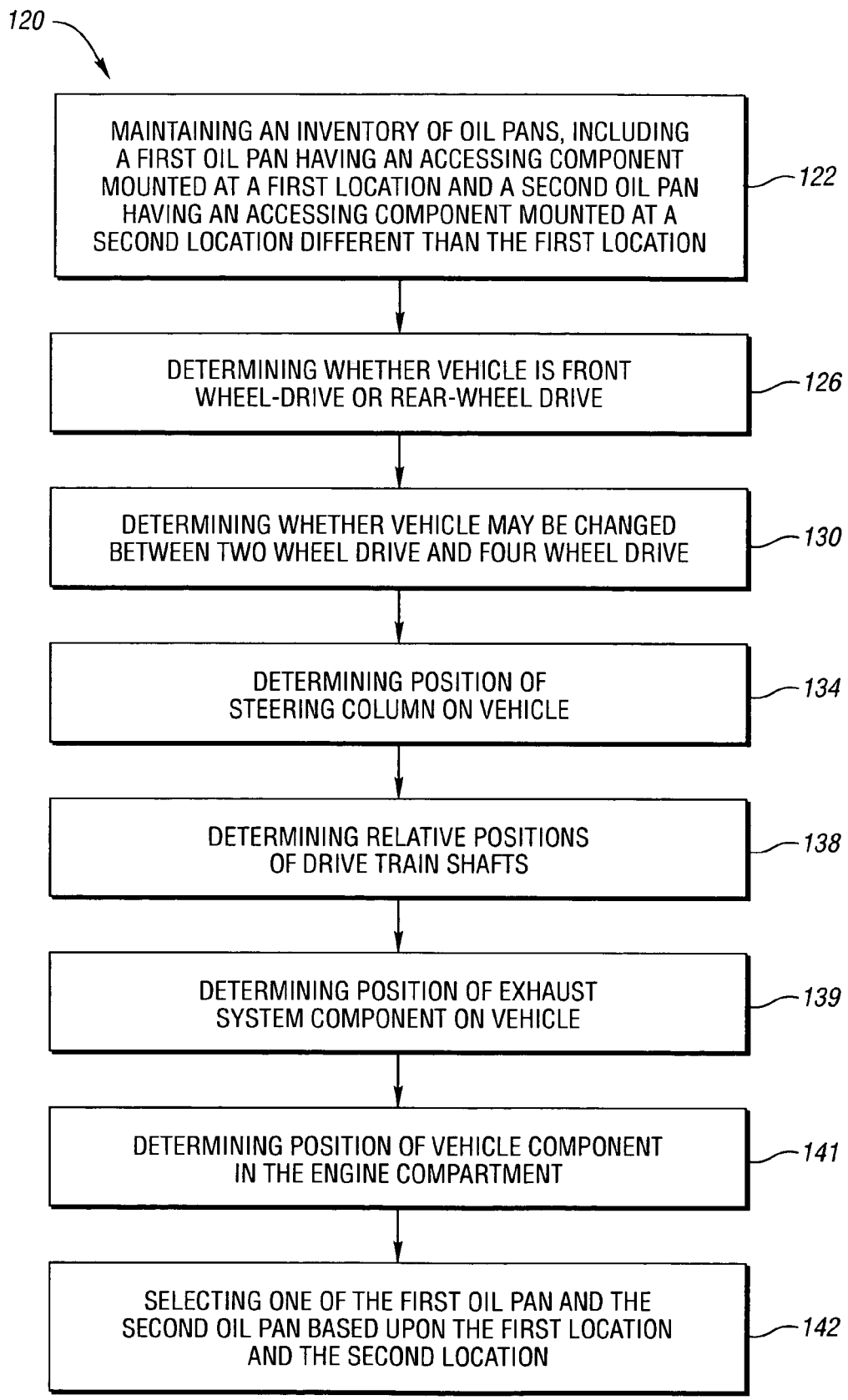
FIG. 4 is a schematic flow diagram of a method of selecting a transmission oil pan.

Referring to FIG. 4, a method 120 of selecting a transmission oil pan for use on a vehicle having a transmission case is schematically depicted. The method 120 need not be performed in the order depicted in FIG. 4. The method 120 includes maintaining an inventory 122 of oil pans matable with the transmission case to at least partially define a transmission interior space. The inventory includes a first oil pan and a second oil pan. Each of the first and second oil pans includes a front sidewall, a rear sidewall, a left sidewall and a right sidewall and a floor extending between the sidewalls. Additionally, each of the first and second oil pans may include an optional extension. An accessing component is mounted to each of the oil pans for accessing an interior component located inside the transmission interior space from outside of the transmission interior space. The accessing component may be an electrical connector or an oil level assembly, both of which are described above. A first accessing component is mounted on the first oil pan at a first location. A second accessing component is mounted on the second oil pan at a second location different than the first location. The first location is selected from the group consisting of the floor, the front sidewall, the rear sidewall, the right sidewall, and the left sidewall. The second location is selected from the same group but is different than the first location. The group from which the first location and the second location are selected may also include an extension. It is intended that the extension is a portion of the oil pan which is a secondary housing member opposing the floor and configured to fit between at least one of the sidewalls and the transmission case, as illustrated in FIGS. 1-2.

The method 120 may further include determining whether the vehicle is front wheel-drive or rear wheel-drive 126. Front wheel-drive vehicles and rear wheel-drive vehicles may have differing drivetrain configurations which may affect the accessibility accessing component and optimal location of the accessing component.

The method 120 may further include determining whether the vehicle may be selectively changed between two wheel-drive and four wheel-drive 130. Such a vehicle may have a differing drivetrain configuration than a vehicle that is solely two wheel-drive. This may affect the accessibility and convenience of an accessing component location.

The method 120 may further include determining the position of the steering column on the vehicle 134. A vehicle having a steering column disposed on the left side of the vehicle may have a different preferred location for an accessing component than a vehicle having a steering column disposed on the right side of the vehicle.

The method 120 may further include determining the relative positions of the drivetrain shafts on the vehicle 138. Positioning of drivetrain shafts on a vehicle with respect to each other and with respect to other vehicle componentry may also affect the convenience and accessibility of a given accessing component location.

The method 120 may further include determining the position of an exhaust system component on the vehicle 139. Exhaust systems may have a multitude of exhaust system components located on the vehicle, which may affect the optimal location of the accessing component on the oil pan.

The method 120 may further include determining the position of a vehicle component 141 in an engine compartment on the vehicle. If the accessing component is an oil level assembly, as described above, it may have a portion (e.g., the grab handle 19, shown in FIG. 1) extending into the engine compartment. The optional position of the grab handle and the fill tube receiving structure (28', also shown in FIG. 1) may be affected by the positions of the vehicle components in the engine compartment.

The method 120 includes selecting one of the first oil pan and the second oil pan 142 based upon the first location and the second location. Accordingly, the method 120 allows for optimal selection between a variety of oil pans with differently disposed accessing components based upon relative vehicle-specific factors such as front wheel-drive versus rear wheel-drive, two wheel-drive versus four wheel-drive, steering column position and drivetrain shaft configurations.

As set forth in the claims, various features shown and described in accordance with the different embodiments of the invention illustrated may be combined.

While the best modes for carrying out the invention have been described in detail, those familiar with the art to which this invention relates will recognize various alternative designs and embodiments for practicing the invention within the scope of the appended claims.

The invention claimed is:

1. A transmission oil pan assembly comprising:
   an oil pan mated with a transmission case to at least partially define a transmission interior space; wherein the transmission case forms a transmission case pan rail;
   an accessing component for accessing an interior component located inside of the transmission interior space from outside of the transmission interior space;
   wherein the oil pan includes:
      a bottom portion having a plurality of sidewalls forming a bottom portion flange and further having a floor connecting the sidewalls opposite the bottom portion flange;
      an extension forming an extension flange mated with the bottom portion flange and defining an opening;
   wherein the transmission case pan rail is mated to the extension at the opening such that the bottom portion extends laterally outward from beneath the transmission case; and wherein the extension includes a domed portion extending upward above the extension flange and higher than the opening in the extension.

2. The transmission oil pan assembly of claim 1, wherein the domed portion forms an opening adapted to receive the accessing component.

3. The transmission oil pan assembly of claim 1, wherein the transmission case is characterized by the absence of openings adapted to receive the accessing component, and wherein the accessing component is selected from the group consisting of an electrical connector and an oil level assembly, the oil level assembly including an oil level measuring device and fill tube receiving structure.

4. The transmission oil pan assembly of claim 1, further comprising:
   a gasket formed in one of the transmission case and the oil pan such that the gasket is disposable between the transmission case and the oil pan for sealing therebetween.

5. The transmission oil pan assembly of claim 1, further comprising:
   an oil filter disposable within the transmission interior space and connectable to the oil pan.

6. The transmission oil pan assembly of claim 5, wherein the oil pan is formed integrally with the oil filter.

7. The transmission oil pan assembly of claim 1, wherein the oil pan is fastenable to the transmission case by fasteners disposable through the floor.

8. The transmission oil pan assembly of claim 1, flange and wherein the oil pan is fastenable to the transmission case by fasteners disposable through the bottom portion flange.

9. The transmission oil pan assembly of claim 1, wherein the oil pan is stamped metal.

10. The transmission oil pan assembly of claim 1, wherein the oil pan is injection molded.

11. The transmission oil pan assembly of claim 1, wherein the oil pan is machined aluminum.

12. The transmission oil pan assembly of claim 1, wherein the accessing component is an electrical connector adaptable for transmitting non-mechanical control signals between at least one electrical component located outside of the transmission interior space and the interior component, wherein the interior component is at least one other electrical component.

13. The transmission oil pan assembly of claim 12, wherein the electrical connector is integrally formed with the structure adapted to support the accessing component.

14. The transmission oil pan assembly of claim 12, wherein the electrical connector is mountable in the floor.

15. The transmission oil pan assembly of claim 12, further comprising:
   a frame having integral wires, wherein the frame is disposable within the transmission interior space between the electrical connector and said at least one other electrical component located within the transmission interior space for transmitting electrical signals between the connector and said at least one other electrical component.

16. The transmission oil pan assembly of claim 12, further comprising:
   a transmission control unit for generating control signals and transmitting said control signals to said at least one other electrical component located within the transmission interior space, wherein the transmission control unit is disposable within the transmission interior space and is operably connectable to the electrical connector.

17. The transmission oil pan assembly of claim 1, wherein said accessing component is an oil level assembly and said interior component is oil, wherein the oil is characterized by an oil level, wherein said oil level assembly includes an oil level measuring device and fill tube receiving structure, wherein said structure adapted to support the accessing component is adapted to support the fill tube receiving structure, wherein the fill tube receiving structure is connectable to an oil fill tube located on the vehicle and usable for adding oil to the transmission, and wherein the oil level measuring device is translatable within the fill tube receiving structure for measuring the oil level within the transmission interior space.

18. The transmission oil pan assembly of claim 17, wherein the fill tube receiving structure is integrally formed with the structure adapted to support the accessing component.

* * * * *